United States Patent
Yee et al.

(10) Patent No.: US 12,118,535 B2
(45) Date of Patent: Oct. 15, 2024

(54) SYSTEM AND TECHNIQUES FOR DETECTING THE ORIENTATION OF A TRANSACTION CARD

(71) Applicant: Capital One Services, LLC, McLean, VA (US)

(72) Inventors: Bryant Yee, Washington, DC (US); Tyler Maiman, Melville, NY (US); Kevin Osborn, Newton Highlands, MA (US)

(73) Assignee: Capital One Services, LLC, McLean, VA (US)

( * ) Notice: Subject to any disclaimer, the term of this patent is extended or adjusted under 35 U.S.C. 154(b) by 23 days.

(21) Appl. No.: 17/983,780

(22) Filed: Nov. 9, 2022

(65) Prior Publication Data

US 2024/0152901 A1    May 9, 2024

(51) Int. Cl.
*G06K 19/07* (2006.01)
*G06Q 20/34* (2012.01)

(52) U.S. Cl.
CPC ....... *G06Q 20/352* (2013.01); *G06K 19/0717* (2013.01); *G06Q 20/357* (2013.01)

(58) Field of Classification Search
CPC .... G06Q 20/352; G06Q 20/341; G06Q 20/34; G06Q 20/357; G06K 19/07; G06K 19/0717; G06K 19/0723; G06K 19/072; G06K 19/06084; G06K 19/06037; G06K 19/06159; G06K 19/06028; G06K 7/10722; G06K 7/1417; G06K 7/1413; G06K 7/10871; B42D 25/324; B42D 25/313; B42D 25/36; B42D 25/387; B42D 25/41;

(Continued)

(56) References Cited

U.S. PATENT DOCUMENTS 10,726,219 B1 *   7/2020   Yaqub ............... G06K 7/10366
10,825,017 B1 *   11/2020  Johnson ............. G06Q 20/341
11,138,488 B2   10/2021   Stahlhut et al.
(Continued)

FOREIGN PATENT DOCUMENTS

WO    WO-2018174803 A1 *   9/2018   ........... H04B 17/373

OTHER PUBLICATIONS

Xun, "Design and implementation of MARG sensors for 3-DOF orientation measurement of rigid bodies" (Year: 2003).*

*Primary Examiner* — Thien T Mai
(74) *Attorney, Agent, or Firm* — KDW Firm PLLC

(57) ABSTRACT

Disclosed is a contactless card, and a system in which the contactless card may be used. The contactless card may include a chip component, a communication interface, processing circuitry, and electromagnetic field sensing circuitry. The electromagnetic field sensing circuitry of the contactless card may be operable to provide orientation signals to the processing circuitry when the contactless card is in proximity to an oscillating electromagnetic field output by a card reader device. The processing circuitry of the contactless card may be operable to receive the orientation signals. An orientation of the contactless card with respect to the mobile device may be determined. An orientation indication signal may be generated based on the determined orientation, and a haptic indication, an audio indication, a visual indication or a combination directing movement of the contactless card in a particular direction may be output.

20 Claims, 8 Drawing Sheets

(58) Field of Classification Search
CPC .... B42D 25/44; B42D 25/425; B42D 25/445; B42D 15/00; B41M 1/04; B41M 3/14
See application file for complete search history.

(56) References Cited

U.S. PATENT DOCUMENTS

| | | | |
|---|---|---|---|
| 2003/0066537 A1* | 4/2003 | Fabian | A61B 5/06 128/899 |
| 2005/0246109 A1* | 11/2005 | Bang | G06F 3/0346 702/41 |
| 2017/0361207 A1* | 12/2017 | Brumbalow | G09F 13/08 |
| 2021/0103914 A1* | 4/2021 | Pinniboyina | G06Q 20/40 |

* cited by examiner (TOP VIEW)
DIRECTION OF THE
DETECTABLE ACCELERATIONS

SYSTEM AND TECHNIQUES FOR DETECTING THE ORIENTATION OF A TRANSACTION CARD

BACKGROUND

The use of contactless cards in transactions is becoming ubiquitous. While the contactless card is configured to be used in "tap" transactions, where the card is placed close to a card reader, often the card reader may not be tap-enabled and requires the card to be "dipped" or inserted into a chip reader slot or magnetic strip reader in the card reader to complete the transaction or exchange of information. To accomplish any of these, the contactless card has to be oriented correctly. However, visually impaired persons are unable to see the orientation of the contactless card. It would be advantageous if the contactless card were able to provide an indication of the correct orientation of the contactless card with respect to a card reader device.

In addition, card readers may provide audible indications of a successful completion of the exchange of information, but do not provide any indication of where the contactless card is with relation to the card reader device. As a result, a user is often haplessly waving the contactless card in and around the card reader device when attempting a tap gesture transaction. In addition, the card reader device or the contactless card do provide an indication of the contactless card's orientation with respect to the card reader device. Hearing-impaired persons also face problems with not receiving an indication of how close the contactless card is to being read or inserted into a card reader device.

It would be further advantageous if a contactless card were available that is be able to assist visually impaired or deaf users by providing a haptic indication as an alternative to, or in addition to, a visual or an auditory sensation.

BRIEF SUMMARY

In one aspect, a contactless card is provided that may include a sensor, card orientation indicator circuitry and a processor. The sensor may be operable to generate signals in response to being in close proximity to a source of an oscillating (or time-varying) electromagnetic field, where each generated signal of the generated signals has an electrical characteristic. The card orientation indicator circuitry may be operable to output an indication of an orientation of the contactless card. The processor may be coupled to the sensor, where the processor is operable to determine, based on an electrical characteristic of each generated signal of the generated signals, the orientation of the contactless card with respect to the source of the oscillating electromagnetic field, generate an orientation signal based on a determination of the orientation of the contactless card with respect to the source of the oscillating electromagnetic field, output the orientation signal to the card orientation indicator circuitry. The card orientation indicator circuitry may be operable to receive the orientation signal, and in response to the received orientation signal, generate an orientation indication signal usable that causes an indication of a direction of movement of the contactless card to adjust the orientation of the contactless card with respect to the source of the oscillating electromagnetic field.

In a further aspect, a contactless card orientation indication system may include a contactless card and a mobile device. The contactless card may include a chip component, a communication interface, processing circuitry, and electromagnetic field sensing circuitry. The mobile device may include a processor, a wireless communication interface, an output device, and a memory storing a computer application and programming code that are executable by the processor and enable the processor to communication with the contactless card. The electromagnetic field sensing circuitry of the contactless card may be operable to provide orientation signals to the processing circuitry of the contactless card when the contactless card is in proximity to an oscillating electromagnetic field output by the card reader device. The processing circuitry of the contactless card is operable to receive the orientation signals and determine an orientation of the contactless card with respect to the mobile device. An orientation indication signal may be generated based on the determined orientation, and using the generated orientation indication signal, a haptic indication, an audio indication, a visual indication or a combination directing movement of the contactless card in a particular direction may be output.

DETAILED DESCRIPTION

With general reference to notations and nomenclature used herein, one or more portions of the detailed description which follows may be presented in terms of program procedures executed on a computer or network of computers. These procedural descriptions and representations are used by those skilled in the art to convey the substances of their work most effectively to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic, or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include digital computers as selectively activated or configured by a computer program stored within that is written in accordance with the teachings herein, and/or include apparatus specially constructed for the required purpose or a digital computer. Various embodiments also relate to apparatus or systems for performing these operations. These apparatuses may be specially constructed for the required purpose. The required structure for a variety of these machines will be apparent from the description given.

In the following description, for the purpose of explanation, numerous specific details are set forth to provide a thorough understanding thereof. It may be evident, however, that the novel embodiments can be practiced without these specific details. In other instances, well known structures and devices are shown in block diagram form to facilitate a description thereof. The intention is to cover all modification, equivalents, and alternatives within the scope of the claims.

The following provides a description of an improved contactless card, a related payment system and techniques that aid visually impaired users to present the contactless card more effectively to a transaction device, such as a card reader device or the card reader-equipped mobile device to allow for providing identifying and authentication information via the contactless card.

Figure 1:
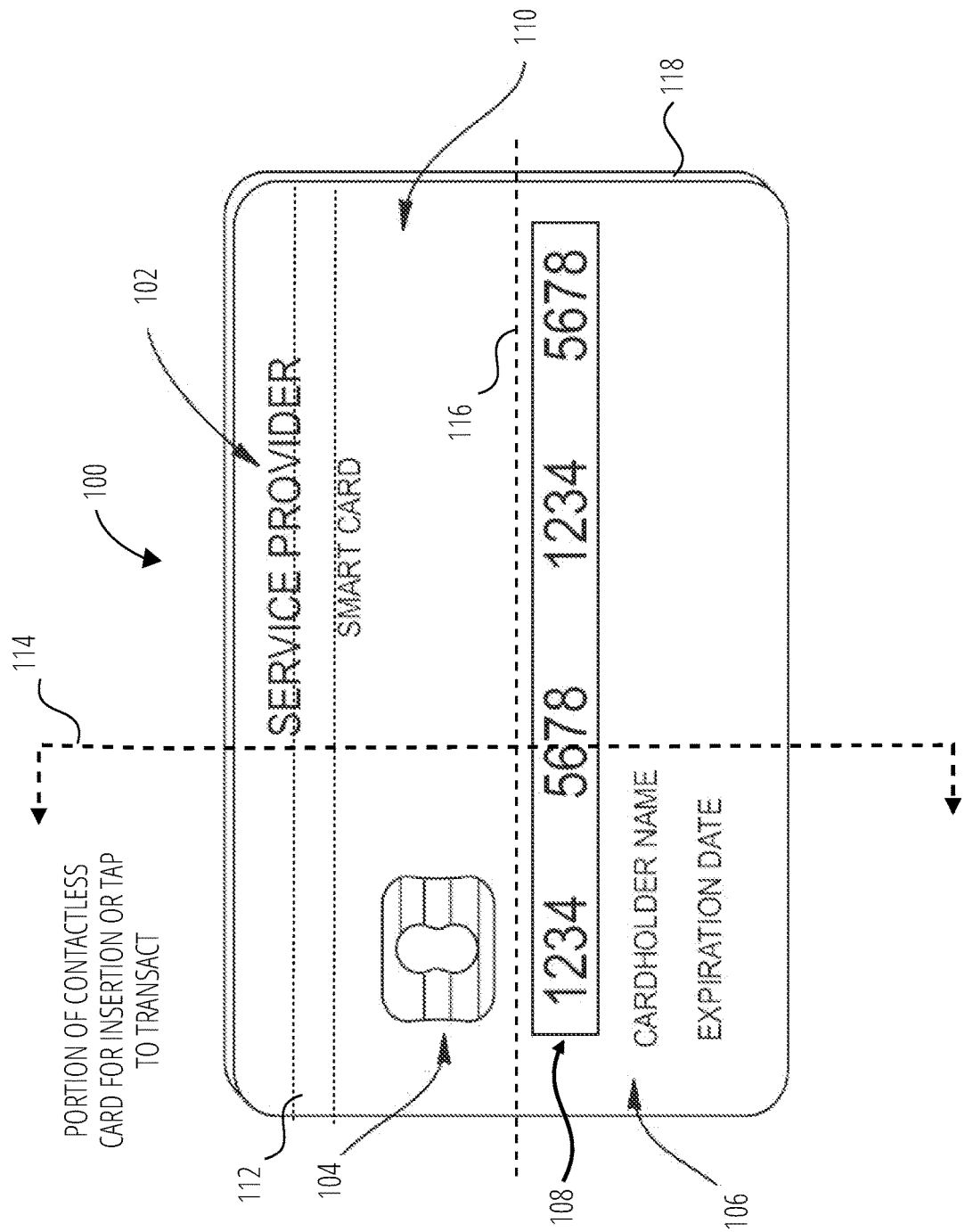
FIG. 1 illustrates an aspect of the subject matter in accordance with an embodiment.

FIG. 1 provides a front view of an example of a contactless card 100 suitable for use in the example processes described herein. The contactless card 100 may be operable as a payment card, such as a credit card, debit card, or gift card, issued by a service provider/issuer, whose issuer name 102 is displayed on the front (or the back, in some examples) of the contactless card 100. The contactless, contactless card 100 may also include user identification information 106 displayed on the front and/or back of the contactless card 100, a card identifier 108, and a contact pad 104 (also referred to as chip component) as well as the service provider/issuer name 102. A magnetic strip 112 may be present on the back of the contactless card 100. The magnetic strip 112 may include magnetically encoded information, such as at least another representation of the card identifier 108, user identification information 106 (e.g., a cardholder name or an account number), or the like.

The contactless card 100 may include a substrate 110, which may include a single layer, or one or more laminated layers composed of plastics, metals, and other materials. Examples of materials that may be used to form the substrate 110 include polyvinyl chloride, polyvinyl chloride acetate, acrylonitrile butadiene styrene, polycarbonate, polyesters, anodized titanium, palladium, gold, carbon, paper, biodegradable materials, and or the like. In some examples, the contactless card 100 may have physical characteristics compliant with the ID-1 format of the ISO/IEC 7810 standard, and the contactless card 100 may otherwise be compliant with the ISO/IEC 14443 standard. However, it is understood that the contactless card 100 according to the present disclosure may have different characteristics.

The card identifier 108 may be a static presentation of an assigned payment card number. For example, the static presentation may be made by painting, printing, embossing, etching or the like, the assigned payment card number to a front surface or back surface of the substrate 110. The card identifier 108 may be an electronic ink display that responds to drive signals to set the state of the display, and in response to the drive signals being removed the electronic ink display remains static in the state set by the last applied drive signal. For example, an example of a currently displayed or prior-assigned payment card number may be "1234 5678 1234 5678" as shown in the card identifier 108. The contactless card 100 may also include a magnetic strip or tape, which may be located on the back of the card (not shown). As described in the following examples, the currently displayed or prior-assigned payment card number "1234 5678 1234 5678" may be written over with an updated card number such as "0987 6543 2109 8765" or the like. As a result, the payment card with the updated card number may be reissued and used in future transactions.

The contactless card 100 may also include user identification information 106 displayed on the front and/or back of the card, and a contact pad 104. The user identification information 106 (shown as "Cardholder Name") may be a user's name or nickname. The contact pad 104 may be operable to establish contact with another communication device, such as a mobile device, a smart phone, a laptop, a desktop, a tablet computer, or the like. The contactless card 100 may also include processing circuitry, antenna, power supply circuitry, communication circuitry, and other components shown in other examples. In an example, these components may be located behind the contact pad 104 or elsewhere on the substrate 110.

The contact pad 104 is shown in FIG. 1 to the left of insertion line 114 (shown as dashed lined in FIG. 1). The card orientation indication system as described may also include where a chosen orientation of the contactless card 100 is one in which the chip component or contact pad 104 of the contactless card 100 is closest to the card reader device (shown in a later example). As discussed in later examples, when the contactless card 100 is operable to provide or exchange information with a card reader device, the contactless card 100 may interact with the card reader in several ways, such as a tap gesture, insertion of the contact pad 104 into a card insertion lot, and insertion of a magnetic strip 112 into a magnetic strip reader (also shown in a later example) of the card reader device.

Figure 2:
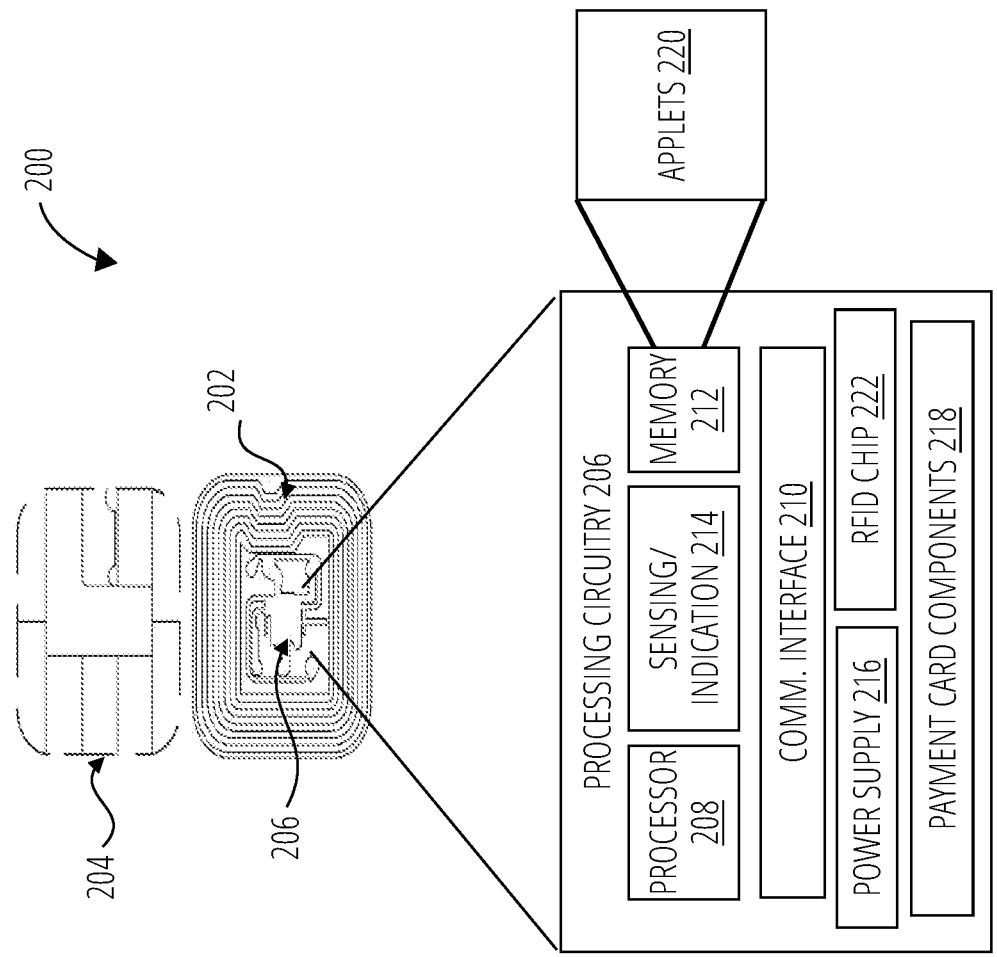
FIG. 2 illustrates an example of a chip component architecture suitable for implementing the functions and systems described herein.

FIG. 2 illustrates an example of a chip component architecture 200 suitable for implementing the functions and systems described herein. The chip component architecture 200 may include antennas 202, a contact pad 204, and a processing circuitry 206. The processing circuitry 206 may include a processor 208, a communication interface 210, a memory 212, a sensing/indication circuitry 214, a power supply 216, radio frequency identification chip 222, and a payment card components 218.

As illustrated in FIG. 2, processing circuitry 206 may be positioned underneath (and coupled to) the contact pad 204 and be operable to process and store information and one or more antennas 202. In addition to a logic circuit and the like, it is understood that the processing circuitry 206 may, for example, contain additional components, including processors, memories, error and parity/CRC checkers, data encoders, anti-collision algorithms, controllers, command decoders, security primitives, tamper-proofing hardware, or the like that are operable to perform the functions described herein.

The sensing/indication circuitry 214 may include a number of circuits responsive to a strength of an electromagnetic field produced by a card reader device (described in a later example), individual circuits of the number of circuits may be located apart from one another within the contactless card, and each individual circuit outputs an electrical signal as one signal that forms the orientation signals received by the processor 208.

The one or more antennas 202 may be placed within the payment card and under contact pad 204 and around the processing circuitry of the contact pad 204. For example, the one or more antennas 202 may be integral with the processing circuitry 206, while another of the one or more antennas may be used with an external booster coil. In another example, the one or more antennas 202 may be external to the contact pad 204 and the processing circuitry. The one or more antennas 202 may also provide inductance needed to harvest power to drive, for example, the processing circuitry 206, the memory 212, and the like. The processing circuitry 206 may include a power management unit (shown in a later example) which may be operable to manage the power supply 216 for the contactless card 100.

The memory 212 may be a read-only memory, write-once read-multiple memory, or read/write memory, e.g., RAM, ROM, and EEPROM, and the processing circuitry 206 may include one or more of these memories. For example, a read-only memory may be factory programmable as read-only or one-time programmable. One-time programmability provides the opportunity to write once then read many times. A write once/read-multiple memory may be programmed at a point in time after the memory chip has left the factory. Once the memory is programmed, it may not be rewritten, but it may be read many times. A read/write memory may be programmed and re-programmed many times after leaving the factory. It may also be read many times.

The memory 212 may be operable to store a cryptographic algorithm, one or more applets 220 and payment card account identifier(s) (not shown in this example). The one or more applets 220 may comprise one or more software applications associated with a respective one or more service provider applications (provided, for example, by service provider/issuer name 102 of FIG. 1) and operable to execute on one or more payment cards, such as a Java Card applet. For example, an applet of applet(s) 220 may be operable to respond to one or more requests, such as near-field data exchange (NDEF) requests, from a reader, such as a Near Field Communication (NFC) reader and produce an NDEF message that comprises a cryptographically secure one-time password (OTP) encoded as an NDEF text tag. According to an example, each applet may store a username for a user associated with the payment card account to access the associated service provider application. The cryptographic algorithm may be executable by the processor 208.

The payment card components 218 may include one or more counters, such as a transaction counter, NFC tap counter and the like. For example, the one or more counters may include a numeric counter sufficient to store an integer that, in some examples, is representative of the number of times the contactless card 100 is used.

The payment card account identifier(s) 350 may comprise a unique alphanumeric identifier assigned to a user of the contactless card 100 and/or one or more encryption keys that together may be used to distinguish the user of the payment card from other payment card users. In some examples, the payment card account identifier(s) may include information identifying both a customer and an account assigned to that customer and may further identify the payment card associated with the customer's account. According to some aspects, the username may be derived from a combination of the one or more of the payment card account identifier(s) and/or one or more encryption keys.

For example, the one or more antennas may be integral with the processing circuitry 206 and the one or more antennas 202 may be used with an external booster coil. As another example, the one or more antennas 202 may be external to the contact pad 204 and the processing circuitry 206. In an example, the one or more antennas 202 may extend around the area of the card to increase the power transfer characteristics of the antenna when placed in an electromagnetic field, such as an NFC field of a mobile device.

The communication interface 210 may, for example, be a wireless communication transceiver operable to communicate via the wireless communication protocol. In one or more examples, the communication interface 210 may be, or be part of, a radio frequency identification (RFID) chip 222, that is coupled to the one or more antennas 202 operable to communicate with a card reader device (shown in a later example) via one or more short-range wireless communication protocols such as near-field communication (NFC), the Europay, Mastercard, Visa (EMV) standard, or the like, and in conformance with ISO/IEC 14443. Although NFC is used as the example communications protocol, the disclosure is equally applicable to other types of wireless communications, such as the EMV standard, Bluetooth, and/or Wi-Fi. The RFID chip 222 may include additional components. For example, the communication interface 210 may be operable to obtain a location indication from a global positioning system application or a Wi-Fi access point, and based on the location indication, the processing circuitry 206 may be operable to determine a location of the card reader device. The location indication may be used to determine manufacturer information related to the card reader device. The manufacturer information may be used to determine capabilities and equipment of the card reader device, such as if the card reader device has a magnetic strip reader 536 or is tap gesture capable or enabled, or the like. The manufacturer information may also provide spatial relationship information related to points where NFC circuitry of the card reader device outputs an electromagnetic field, a location of the chip reader slot in the card reader device and the location of a magnetic strip reader of the card reader device. This information may be stored in a look up table stored in the memory 212.

Via the NFC interaction between the contactless card 100 and a card reader device (described in a later example), the contactless card 100 may harvest energy from the card reader device's NFC signals to perform the functions as described herein.

Figure 3:
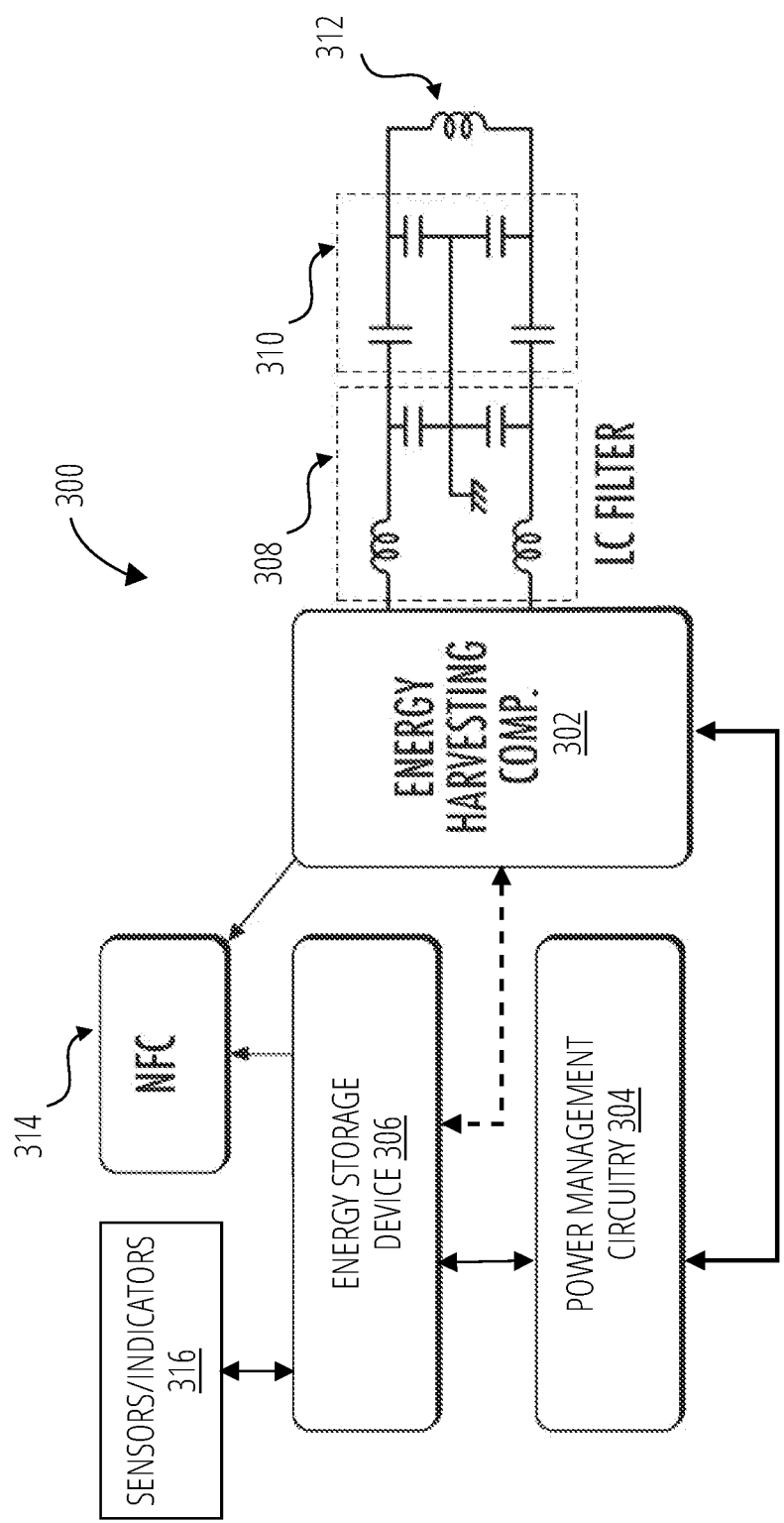
FIG. 3 illustrates an aspect of the subject matter in accordance with one embodiment.

In an example of energy harvesting, FIG. 3 illustrates an example of a power supply 300 that supplies power to a payment card for performing the functions described herein. In the example power supply 300 of FIG. 3, the antenna 312 may be an NFC compatible antenna configured to receive NFC signals. In the example of FIG. 3B, the antenna 312 may be operable to provide both communications and the inductance needed for power harvesting. As mentioned above, the antenna 312 may be coupled to a communication interface (shown in the example of FIG. 2) that provides the signal to processing circuitry for signal processing (as described with reference to FIG. 2). For example, the power captured by the antenna 312 may, for example, be obtained from a 13.56 MHz NFC signal that generates an alternating current within the antenna 312. Of course, radio frequency signals of a frequency different than 13.56 MHz may also be used. The matching circuit 310 may be a part of the antenna 312 that is matched to the incoming magnetic field to produce maximum inductance. In the example, the inductor-capacitor (LC) filter 308 may act as a low pass filter, which removes high-frequency components from the received signal that are unnecessary for communication. The communication output by processing circuitry (shown in FIG. 3A).

The energy from the induced electrical current and induced voltage is harvested by the energy harvesting component 302. The induced voltage may be approximately around 0.1 volts (V). The voltage may be provided to the power management circuitry 304 for rectification, smoothing and other processing as well as distribution to other components, such as sensors/indicators 316 or near-field communication (NFC) circuitry 314 that may be controlled by a microprocessor (shown in other examples). In the example, the induced voltage may power the changes on a rewriteable visual display, such as an e-ink display. If the induced voltage is too low, it may be increased using additional circuit elements and techniques such as using a transformer with a greater number of turns of the coil or an increased permanent magnetic field. The power supply 300 may harvest energy while being used with NFC devices and store the energy harvested in an energy storage device 306, such as a battery, a capacitor, a supercapacitor, or the like. The energy storage device 306 is operable to store electrical power for ongoing or future operations related to the functions described herein as well as other circuits and devices, such as the processor and communication interface described with reference to earlier examples. The power management circuitry 304 may, in a further example, include an intermediate energy storage device, such as a capacitor to smooth out the voltage provided by the energy harvesting component 302.

Figure 4:
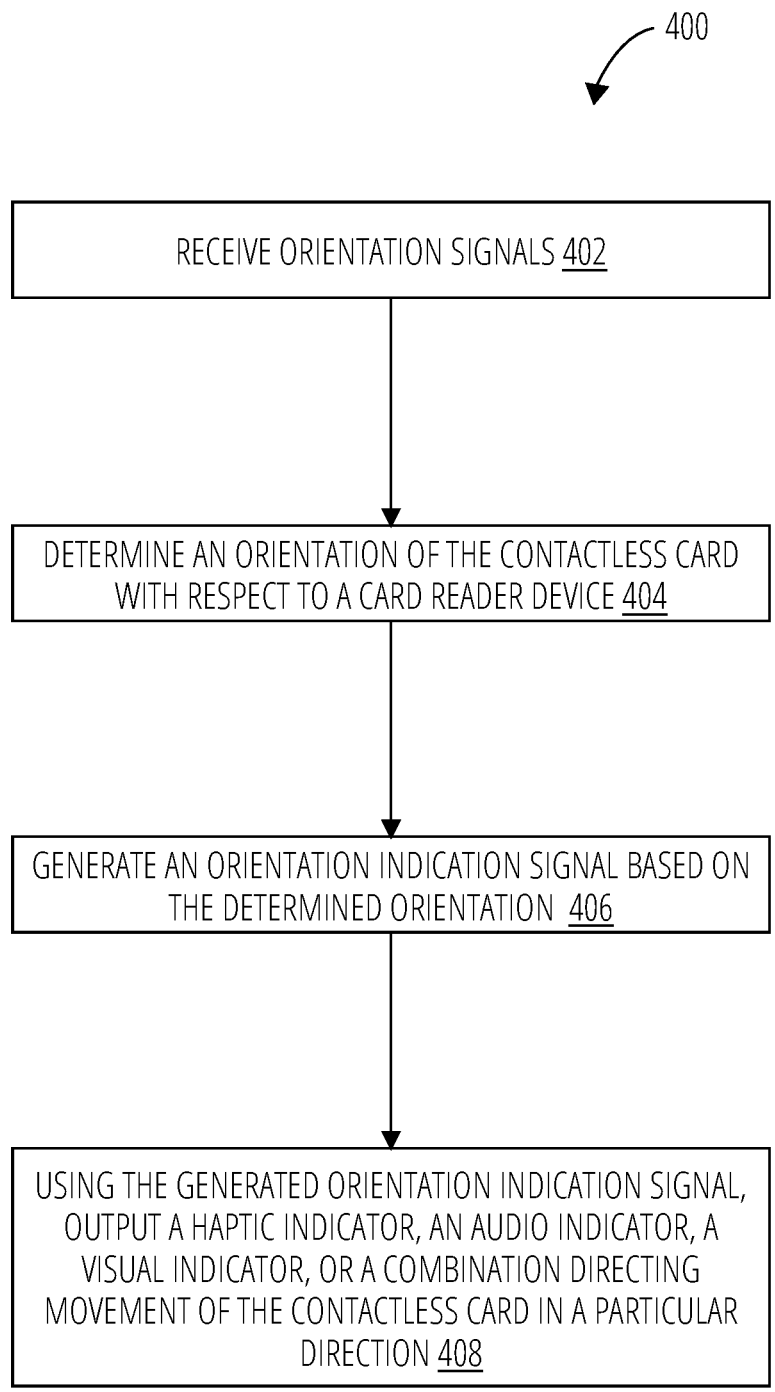
FIG. 4 is a flowchart of an example process that determines and responds to an orientation of a contactless card.

FIG. 4 is a flowchart of an example process that determines and responds to an orientation of a contactless card. The process 400 may be implemented by circuitry (discussed in more detail in other examples) that enables the determination of the orientation of a contactless card with respect to a card reader device (also discussed in more detail in other examples). The contactless card may include processing circuitry, such as that described with reference to processing circuitry 206 of FIG. 2. The contactless card may, for example, include a processor coupled to a sensor and to card orientation indicator circuitry.

For example, at block 402 of process 400, a processing circuitry (also referred to as a processor) within the contactless card may receive orientation signals from sensors also within a contactless card. For example, a sensor, such as an accelerometer, gyroscope, both an accelerometer and a gyroscope, an electromagnetic field strength detector (or circuits) or the like (shown in other examples), may be operable to generate signals in response to being in close proximity to an oscillating electromagnetic field. The source of the oscillating electromagnetic field is a card reading device (shown in other examples). In the example, each generated signal of the generated signals output by a sensor has an electrical characteristic, such as a voltage value (analog or digital), a frequency, a current value, or the like. Alternatively, the sensors may generate a signal based on the strength of the oscillating electromagnetic field or the like. In addition, the oscillating electromagnetic field may be operable to cause an energy harvesting circuitry, such as energy harvesting component 302, in a contactless card that is so equipped, to generate electrical power to be supplied to the respective sensor or sensors, if multiple sensors are used.

The processor may include card orientation indicator circuitry (described in more detail with reference to another example) that is operable to receive the orientation signals from the respective sensors output an indication of an orientation of the contactless card.

In block 404, the processor while executing the process 400 may be operable to determine an orientation of the contactless card with respect to the card reader device using the received orientation signals provided by the sensors. For example, the orientation of the contactless card may be determined based on an electrical characteristic of each generated signal of the signals generated by a sensor. In an example, the electrical characteristic of each signal of the generated signals may have one or more parameters. In the example, the one or more parameters may include at least one of a magnitude or a polarity. The magnitude and/or the polarity may, for example, be based on at least an angle and a distance of the sensor from the source of the oscillating electromagnetic field. Based on the one or more parameters, the processor may determine the orientation of the contactless card with respect to the oscillating electromagnetic field emitted by the card reader device.

In block 406, the processor may generate an orientation indication signal based on the determined orientation. In a specific example, the orientation signal includes an indication of the position of a chip component of the contactless card relative to the source of the oscillating electromagnetic field. The orientation indication signal is output to a card orientation indicator device.

In block 408, the execution of process 400 causes a card orientation indication to be output via the card orientation indicator device. The card orientation indication may, for example, be a haptic indication. For example, the card orientation indicator device may be a haptic device, such as a vibrator device, such as a piezo-electric haptic device that is suitable for installation in a suitably sized, payment card, or the like. Alternatively, or in addition, an audio indication or both, directing movement of the contactless card in a particular direction. For example, the card orientation indicator device may be one or more of an audio device such as a beeper or the like, a visual directional indicator such as a light-emitting-diode light source in the form of directional indicators such as arrows or the like, or a combination of each of a haptic device, an audio device, and a visual directional indicator. In the case of an output of a haptic indication, a haptic device may be operable to vibrate the contactless card when the orientation signal indicates that the determined orientation of the contactless card is unaligned with the source of the oscillating electromagnetic field (as described in more detail with reference to a later example).

The process 400 may be an ongoing process that repeats the output of a card orientation indication until the contactless card is oriented according to the determined orientation and is able to be either tapped at a card reader device (if so equipped) or inserted into a chip reader slot/magnetic reader slot of the card reader device for reading of the contactless card. For example, the processor may determine at some point that the card is within range of the card reader device to be read via a tap gesture or inserted in a card reader slot of the card reader device and may cease the output of the card orientation indication(s). In addition, the card orientation indicator device may generate a haptic output indicating successful alignment of the contactless card with the chip reader slot 532, near-field communication circuitry 534 for a tap gesture or a swipe via magnetic strip reader 536. In an example, one or more of these payment modalities may be selected via a user preferences setting or the like in a companion application (shown in another example).

Figure 5A:
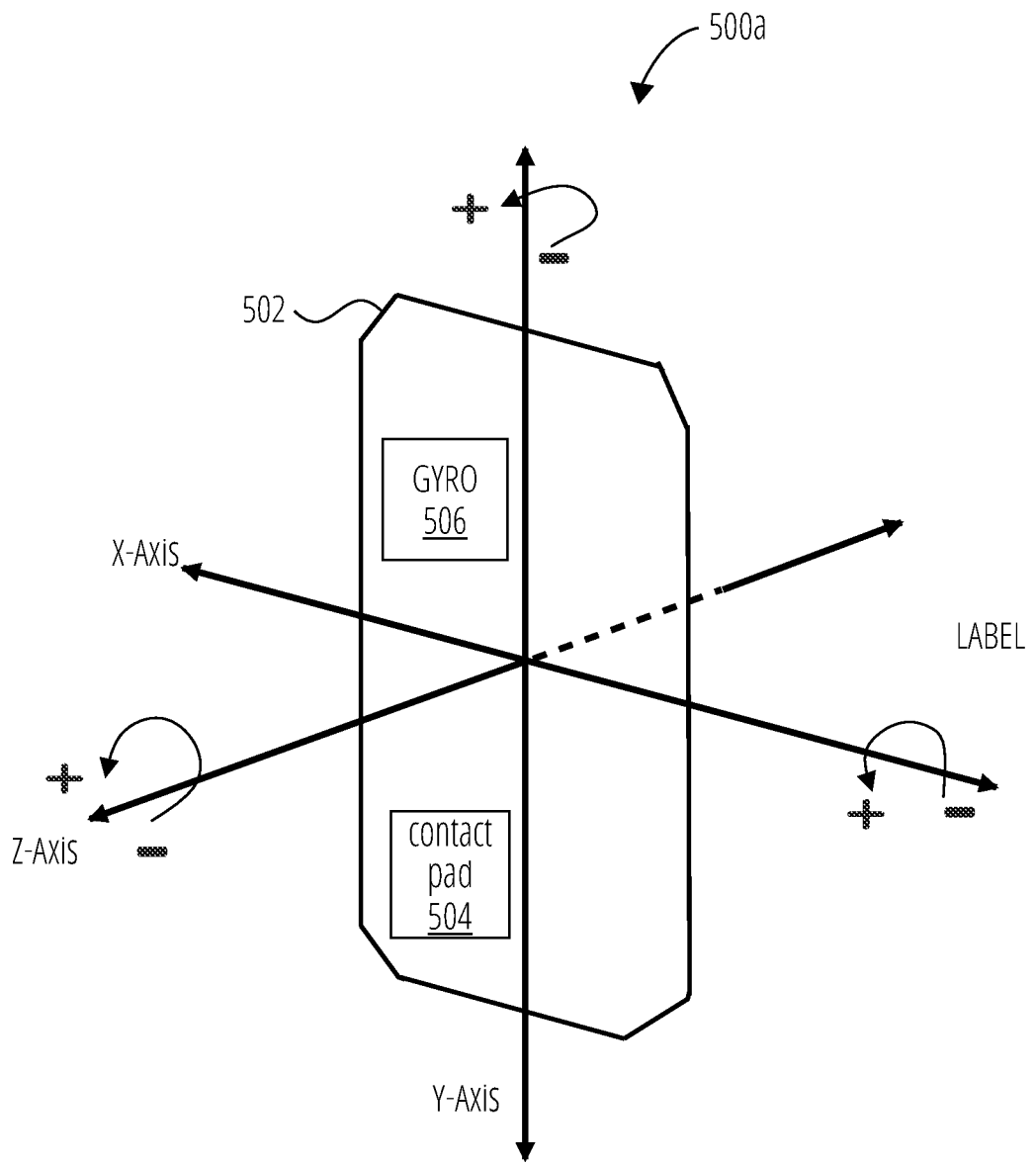
FIG. 5A illustrates three-axes of rotation of a contactless card that may be detected, and an orientation of the contactless card may be determined utilizing the features and techniques described herein.

FIG. 5A illustrates three-axes of rotation of a contactless card that may be detected, and an orientation of the contactless card may be determined utilizing the features and techniques described herein. An example of a sensor that may be incorporated into the contactless card may be a gyroscope. In the gyroscope example 500a, the gyroscope 506 may be a fiber-optic gyroscope (FOG) integrated into the contactless card. A FOG operates by sensing changes in orientation based on the Sagnac effect. The output is substantially similar to that of a mechanical gyroscope. Alternatively, the gyroscope 506 may be a micro-electro-mechanical device or the like. The gyroscope may be powered, for example, by a power supply and/or an energy harvesting circuitry, such as energy harvesting component 302 of FIG. 3, that utilizes the electromagnetic field emitted by a card reader device.

In the example of FIG. 5A, a contactless card 502 is shown in a vertical orientation with the contact pad 504 shown offset from the center of and toward a side of the contactless card 502. The contactless card may include a gyroscope 506 that is an orientation sensor. The gyroscope 506 may be operable to detect motion and angular acceleration in three axes, shown as the X-axis, Y-axis and Z-axis in FIG. 5A. The gyroscope 506 may have three output ports: X, Y, and Z, and each port may be operable to output a value, such as a single-precision scalar value. The gyroscope 506 may be operable to output different values based on whether the rotation within a particular axis is clockwise or counterclockwise. For example, for any axis on the contactless card 502, clockwise rotation outputs negative values, and counterclockwise rotation outputs positive values. For example, if you place the contactless card 502 face up on a table and spin it clockwise, the gyroscope 506 may be operable to output negative values for the Z-axis.

In an operational example, the processor of a contactless card 502 (as well as the other contactless card examples of FIGS. 1-3) may be operable when performing functions such as those described in FIG. 4, such as determining an orientation of the contactless card with respect to the source of the oscillating electromagnetic field be operable to receive signals from the gyroscope 506. For example, the processor may be operable to evaluate an X-axis magnitude and an X-axis polarity of an X-axis signal, a Y-axis magnitude and a Y-axis polarity of a Y-axis signal, and a Z-axis magnitude and a Z-axis polarity of a Z-axis signal. The processor may further be operable to evaluate an angular velocity signal based on the X-axis signal, the Y-axis signal and the Z-axis signal relative to a rotation of the contactless card. An orientation of the contactless card may be determined in an X-axis, Y-axis and in a Z-axis based on the magnitude and the polarity of the X-axis signal, the magnitude and the polarity of the Y-axis signal, the magnitude and polarity of the Z-axis signal, and the angular velocity signal.

In a further example of when the card reader device is a mobile device or part of a mobile device, the gyroscope on some Android™ mobile devices provides a known rate of rotation measurement in rad/s around the X, Y, and Z axes of the mobile device. The mobile device rate of rotation measurements may be used in a determination of a location of the contactless card based on the location of the mobile device. For example, the mobile device may be operable to provide these values to the contactless card which then updates the orientation indication signal by adjusting the parameters calculated by the contactless card using those provided by the mobile device to reflect the orientation of the contactless card more accurately with respect to the position and orientation of the mobile device.

An orientation of the contactless card may also be determined utilizing an accelerometer. For example, the sensors, such as sensing/indication circuitry 214, within a contactless card may be one or more accelerometers, such as accelerometer 500b. An example of a contactless card that utilizes the output of an accelerometer is described with reference to FIG. 5B.

Figure 5B:
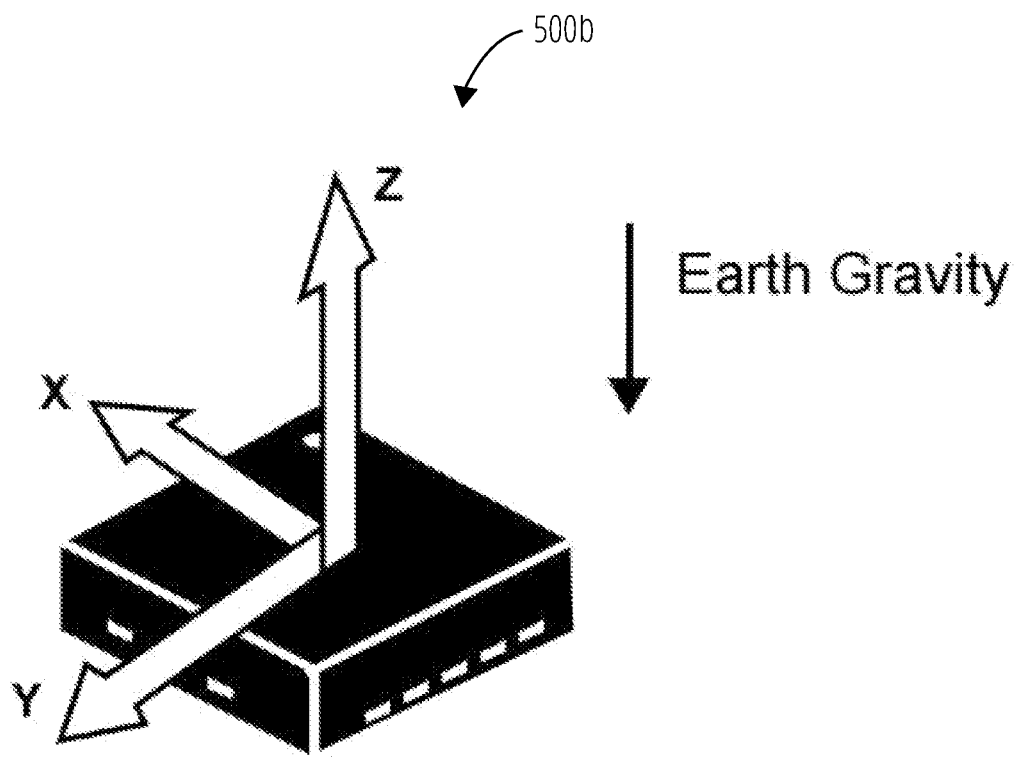
FIG. 5B illustrates an example of an accelerometer and output parameters that may be utilized by the contactless card orientation determination features and techniques described herein.

FIG. 5B illustrates an example of an accelerometer and output parameters that may be utilized by the contactless card orientation determination features and techniques described herein. The programming code executed by a processor to implement the process 400 and determine an orientation of the contactless card may also use a three-dimensional accelerometer. The outputs from the three-dimensional accelerometer 500b may be used in a process, such as process 400, that a processor may execute to detect the orientation of the contactless card by measuring the acceleration due to the Earth's gravity, which is a constant downward force acting on all objects, and the acceleration due to motion of the contactless card. The accelerometer can determine if the device is parallel to Earth's surface or if the device is tilted at an angle. The accelerometer 500b, for example, may be operable to measure the acceleration along each axis (X, Y, Z) and those measurements may be used to calculate an angle of the contactless card in each of the XZ plane, YZ plane, and XY plane.

For example, a contactless card equipped with the accelerometer 500b, and a processor may be operable to detect when the contactless card is upside-down by measuring its tilt from front-to-back (pitch) and from side-to-side (roll).

The types of accelerometers suitable for use may be a high impedance charge output or a low impedance output. For example, the accelerometer 500b may either an analog accelerometer or a digital accelerometer. Analog style accelerometers output a continuous voltage that is proportional to acceleration (e.g., 2.5V for 0 g, 2.6V for 0.5 g, 2.7V for 1 g). Digital accelerometers usually use pulse width modulation (PWM) for their output, which means the output may be a square wave of a certain frequency, and the amount of time the voltage is high will be proportional to the amount of acceleration.

The foregoing example in FIG. 5A was directed to using the output of a gyroscope to determine an orientation of contactless card and the foregoing example in FIG. 5B was directed to using the output of an accelerometer to determine an orientation of contactless card. However, another alternative is the contactless card may be equipped with both a gyroscope and an accelerometer that enables the signals from one to be augmented by the other to provide greater precision with regard to the calculated orientation of the contactless card.

Based on the above discussion with regard to FIG. 5A and FIG. 5B, the sensor or sensors in a contactless card may be a gyroscope, an accelerometer or both.

Figure 5C:
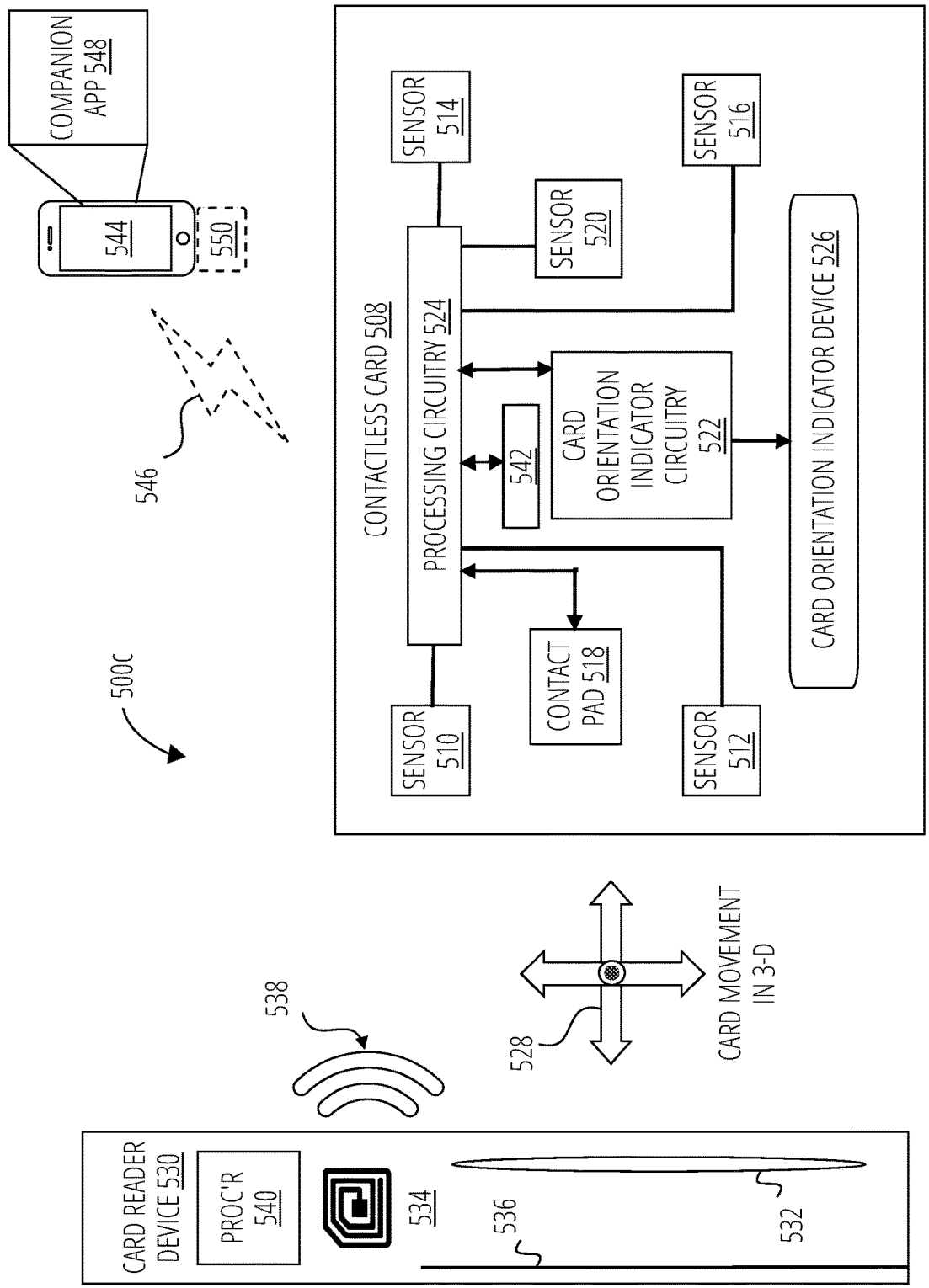
FIG. 5C illustrates a system example utilizing the parameters described with reference to FIG. 5A and FIG. 5B according to aspects of the described subject matter.

FIG. 5C illustrates a system example utilizing the parameters described with reference to the examples of FIGS. 1-5B according to aspects of the described subject matter.

The system 500c may include a contactless card 508 and a card reader device 530. In an alternative example, the system 500c may include mobile device 544 in addition to the contactless card 508 and the card reader device 530.

The contactless card 508 may include a number of sensors, such as sensor 510, sensor 512, sensor 514, sensor 516, a contact pad 518, another sensor 520 (which may be different from the number of sensors 508-514), card orientation indicator circuitry 522, memory 542, and processing circuitry 524. The processing circuitry 524 may include some of or all the components of processing circuitry 206 of FIG. 2, but for ease of illustration some of the components of processing circuitry 206 are shown in FIG. 5C as coupled to processing circuitry 524, such as card orientation indicator circuitry 522, the sensors 510-514, the memory 542 and card orientation indicator device 526. The functions of processing circuitry 206 may be performed by the components and elements shown in contactless card 508.

The card reader device 530 may include near-field communication circuitry 534, a processor 540 and a number of payment modalities (i.e., devices and techniques for obtaining payment information—a chip reader slot 532, tap gesture via near-field communication circuitry 534 or magnetic strip reader 536). The near-field communication circuitry 534 may be operable to generate an electromagnetic field 538. For example, the card reader device 530 may be part of a transaction system that engages with contactless cards, such as contactless card 508, to obtain information that enables the completion of a financial transaction. The contact pad 518 may be similar to the contact pads 104, 204, or 504 as described above with reference to earlier examples.

The card reader device 530 may be part of an electronic transaction or point-of-sale also be a mobile device or a dongle-like device coupled (physically or wirelessly) to a mobile device. The card reader device 530 may include a chip reader slot 532, a near-field communication circuitry 534, a magnetic strip reader 536 and a processor 540. The card reader device 530 may be responsive to tap gestures of the contactless card 508, insertion of the contactless card 508 in the chip reader slot 532, or insertion of the contactless card 508 in the magnetic strip reader 536. The card reader device 530 may also include a processor 540 that is operates to control operation of the card reader device 530. For example, the processor 540 may control the near-field communication circuitry 534 to generate the electromagnetic field 538 to establish communications with a payment device, such as contactless card 508 or an electronic payment-equipped mobile phone. The processor 540 may also control and respond to the insertion of the contactless card 508 into either the chip reader slot 532 or magnetic strip reader 536. Control and response by the 540 to the insertion of the contactless card 508 into either the chip reader slot 532 or magnetic strip reader 536 may include reading information from the contact pad 518 or the magnetic strip (not shown in this example of a contactless card).

In the example, a user may be in the process of a point-of-sale transaction in which the contactless card 508 is being used as a payment card. The user, who may or may not be visually impaired, may begin moving the contactless card 508 in the direction of the card reader device 530 which places the contactless card 508 in close proximity to an electromagnetic field, such as electromagnetic field 538 emitting by the near-field communication circuitry 534 of the card reader device 530. When the contactless card 508 is in close enough proximity to the electromagnetic field 538, the contactless card 508 is enabled to communicate with the card reader device 530. For example, the contactless card 508 is able to provide information to the card reader device 530 to, for example, complete the point-of-sale transaction as well as performing other functions as explained in earlier examples. The electromagnetic field 538 may be an oscillating electromagnetic field and the near-field communication circuitry 534 of the card reader device 530 is the source of the electromagnetic field 538.

In an example of completion of a point-of-sale transaction, payment information may be obtained from the contact pad 504 of the contactless card 508 that enables the transaction to be completed. While the contactless card 508 is being directed toward the card reader device 530 so the payment information may be obtained from the contact pad 504, the processing circuitry 524 and/or the card orientation indicator circuitry 522 of the contactless card 508 may be operable to execute process 400. During execution of process 400, the processing circuitry 524 and/or the card orientation indicator circuitry 522 may, for example, be operable to provide a contactless card orientation indication that provides the advantage of enabling a user, and particularly any visually-impaired users, to more quickly and effectively perform the tapping gesture with the contactless card 508, the insertion of the contactless card 508 in the magnetic strip reader 536, or the insertion of the contactless card 508 in the chip reader slot 532. Each of near-field communication circuitry 534, magnetic strip reader 536 and chip reader slot 532 may include logic and circuitry that is coupled to the processor 540 of the card reader device 530 to thereby enable communication with a contactless card 508 and processing of payment information to complete a transaction.

In an operational example, the sensors 510, 512, 514 and 516 may be operable to detect and respond to the oscillating electromagnetic field 538 before the contactless card 508 is close enough to the card reader device 530 to obtain information from the contact pad 504. For example, the sensors may be operable to detect and respond to short-range wireless signals that are similar to or are signals that meet NFC signal specifications. The sensors 510, 512, 514 and 516 may be operable to output a signal nearly continuously, or in real-time or substantially real-time, and the processing circuitry 524 and card orientation indicator circuitry 522 may be operable to also process and generate orientation signals in substantially real-time as well. For example, the sensors 510, 512, 514, 516 and 520 may be generally referred to as electromagnetic field sensing circuitry, be similar to sensing/indication circuitry 214 of FIG. 2. The sensors 510, 512, 514, 516 and 520, for example, may include a number of circuits responsive to a strength of an electromagnetic field produced by the card reader, individual circuits of the number of circuits are located apart from one another within the contactless card, and each individual circuit outputs an electrical signal as one signal that forms the orientation signals.

For the information-conveying signal to be obtained with acceptable accuracy, typically, a separation of 10 cm or less between the contactless card 508 and the near-field communication circuitry 534. For example, the NFC protocol is set to operate at approximately 13.56 MHz on ISO/IEC 18000-3 air interface and at bit rates ranging from 106 kbit/s to 424 kbit/s. The sensors 510, 512, 514 and 516 may be operable to detect signals within the 13.56 MHz frequency range and output an indication of received signal strength. In addition to received signal strength, the sensors 510, 512, 514 and 516 may be operable to output an indication of direction in three-dimensions (i.e., X, Y and Z). In addition, the contactless card 508 may also include an accelerometer or a gyroscope, such as the sensor 520. The output of each of the sensors 510, 512, 514 and 516 as well as the output of sensor 520 in this example may be output to the processing circuitry 524. The sensors 510, 512, 514 and 516 as well as the output of sensor 520 may be operable to generate signals based on the card movement in three-dimensions 528. The outputs may be processed (e.g., amplified, smoothed, analog-todigital converted, or the like) by processing circuitry 524 prior to output to the card orientation indicator circuitry 522. The card orientation indicator circuitry 522 is shown separately, but the functions provided by the card orientation indicator circuitry 522 may be performed by the processing circuitry 524, and the two different circuitries may be combined to perform the functions as described herein.

Returning to the example, the processing circuitry 524 may forward the sensor signals, either processed or unprocessed to the card orientation indicator circuitry 522 for further processing to generate orientation indication signals. For example, the card orientation indicator circuitry 522 may be operable, based on the electrical characteristic of each generated signal of the generated signals, to determine an orientation of the contactless card with respect to the source (i.e., the near-field communication circuitry 534 of the 530) of the oscillating electromagnetic field 538.

For example, the processing circuitry 524, which may also be referred to as a processor, may be operable to generate based on individual signals from the sensors 510, 512, 514 and 516 from the received sensor signals an X-axis signal, a Y-axis signal, and a Z-axis signal. Each of the X-axis, Y-axis and Z-axis signals may have a magnitude and a polarity, such as plus or minus that indicate a direction from a plane of origin of the respective signal. evaluate a magnitude and a polarity of an X-axis signal, a magnitude and a polarity of a Y-axis signal and a magnitude and a polarity of a Z-axis signal and determine the orientation of the contactless card in an X-axis, Y-axis and Z-axis based on the magnitude and the polarity of the X-axis signal, the magnitude and the polarity of the Y-axis signal, and the magnitude and the polarity of the Z-axis signal. The determined orientation of the contactless card 508 is with respect to the source of the electromagnetic field 538 (i.e., the near-field communication circuitry 534).

When the card orientation indicator circuitry 522 determines the orientation, an orientation indication signal may be generated by the card orientation indicator circuitry 522 and output to the orientation indication signal to the card orientation indicator device 526.

In a further example, the sensor 520 of the contactless card 508 may be a combination of a gyroscope and an accelerometer (i.e., the sensor 520 includes both a gyroscope and an accelerometer). In such an example, when the output of the sensor 520 is included with the signals from the other sensors 510, 512, 514 and 516, the processor, based on the magnitude and the polarity of each generated signal of the generated signals by the sensors 510, 512, 514 and 516, may determine an orientation of the contactless card 508 with respect to the source of the oscillating electromagnetic field, by evaluating an X-axis magnitude and an X-axis polarity of an X-axis signal, a Y-axis magnitude and a Y-axis polarity of a Y-axis signal and a Z-axis magnitude and a Z-axis polarity of a Z-axis signal as well as evaluating an angular velocity signal relative to a rotation of the contactless card 508 based on the respective X-axis signal, the Y-axis signal and the z-axis signal. The card orientation indicator circuitry 522 may determine the orientation of the contactless card in an X-axis, Y-axis and in a Z-axis based on the magnitude and the polarity of the X-axis signal, the magnitude and the polarity of the Y-axis signal and the angular velocity signal. In response to determining the orientation, an orientation indication signal may be generated by the card orientation indicator circuitry 522 and output to the orientation indication signal to the card orientation indicator device 526.

The card orientation indicator device 526 of the contactless card 508 may be at least one of a light emitting diode, a vibrating motor, speaker, or a combination thereof. In a specific example, the card orientation indicator device 526 may be a vibrational device that is operable to vibrate the contactless card when the orientation signal corresponding to the determined orientation indicates that contact pad 518 of the contactless card is unaligned with the near-field communication circuitry 534 (i.e., the source of the oscillating electromagnetic field 538). The vibrations, for example, may indicate that the card is in the wrong orientation when using a card reader, or the closeness of the card to the card reader device. For example, the frequency of the vibration may indicate in which direction the contactless card 508 should be moved to better align with one of the payment information modalities (i.e., near-field communication circuitry 534, the magnetic strip reader 536 or the chip reader slot 532.)

In a further specific example (with reference to the contactless card axes of FIG. 5A), a first particular vibration pattern may be triggered based on a Z-axis signal and a Y-axis signal that indicates to the user to move the card upwards in the Z-axis and forward in the Y-axis to move the contact pad (e.g., 504 or 518) closer to the card reader device 530. A second particular vibrational pattern may be triggered based on an X-axis signal and a Y-axis signal that indicates to the user to move the card left or right in the X-axis and forward or back in the Y-axis to move the contact pad (e.g., 504 or 518) closer to the card reader device 530. It is envisioned that third, fourth or fifth particular vibrational patterns may be produced as well as a final particular vibrational pattern that indicates successful tapping or dipping of the card in a respective one of the payment modalities (i.e., near-field communication circuitry 534, chip reader slot 532 or magnetic strip reader 536) of the card reader device 530.

For example, card orientation indicator circuitry 522, which may also be referred to as a processor, when producing the indication of the orientation of the contactless card 508 with respect to the source of the oscillating electromagnetic field (i.e., near-field communication circuitry 534) to generate predetermined signals that indicate a direction of movement of the contactless card 508 to increase/decrease the parameter of the electrical characteristic output by the respective sensors 510, 512, 514, 516 and, if the contactless card 508 is so equipped, sensor 520. For example, orientation indication signal is usable by card orientation indicator device 526 to generate an indication of a direction of movement of the contactless card 508 to adjust the orientation of the contactless card with respect to the source of the oscillating electromagnetic field. The indication to adjust the orientation of the contactless card 508 may cause the sensors 510-516 to detect an increase in the strength of the oscillating electromagnetic field, thereby indicating that the orientation of the contactless card 508 is aligned with the near-field communication circuitry 534 to enable a tap gesture, is being accurately directed to the chip reader slot 532 or the magnetic strip reader 536. For example, the generated indication of direction of movement of the contactless card 508 may be presented by the card orientation indicator device 526 indications for the contactless card 508 to be moved forward, rotate the contactless card 508 along a horizontal axis (e.g., the horizontal axis 116 along which the card identifier 108 and user identification information 106 (e.g., cardholder name) is presented on the contactless card 508), and lift a back end (i.e., the back end 118 opposite the contact pad 104).

Each of electromagnetic field 538, chip reader slot 532, and magnetic strip reader 536 are positioned at different locations of the card reader device 530 for vibration to indicate the near-field communication circuitry 534, the magnetic strip reader 536 or the chip reader slot 532 with which to direct the contactless card 508 to interact. The card orientation indicator circuitry 522 may include information related to where each of these payment information modalities may be located on the card reader device 530. In addition, different card reader device manufacturers may locate a tap location, a magnetic strip reader 536 or a chip reader slot 532 at different positions on the device or may even omit one or two of them (e.g., the card reader device only has a chip reader slot 532 or the like).

So as the contactless card 508 proceeds toward the card reader device 530, the processing circuitry 524 may receive identifying information that identifies the card reader device 530 as a particular manufacturer's model or the like, and the memory 542 may store a look up table with that information as well as where on the particular manufacturer's mode of card reader device 530 the respective near-field communication circuitry 534, the magnetic strip reader 536 or the chip reader slot 532 are located.

Using this information in combination with the signals from the respective sensors 510, 512, 514, 516 and/or sensor 520, the card orientation indicator circuitry 522 may be operable to compensate the orientation signals output to the card orientation indicator device 526 so the direction. The card orientation indicator circuitry 522 may be operable to generate signals that direct the contactless card 508 toward the respective payment modality that is suitable for the card reader device 530 to receive the payment information. For example, the card orientation indicator circuitry 522 may include logic, such as a processor, or may in combination with processing circuitry 524, be operable to determine how the contactless card 508 should be moved in the X-axis, Y-axis, and Z-axis direction that corresponds to a value of a parameter or parameters of an electrical characteristic (e.g., a specific signal strength (of the electromagnetic field 538, for example) in one dimension, two dimensions or three dimensions, or the like) of the X-axis, Y-axis, and Z-axis signals that are output by the respective sensors 510, 512, 514, 516 and/or 520 that indicate the contact pad 518 is in a position to be read by the card reader device 530. The value of the parameter of the electrical characteristic may differ depending upon which payment modality is provided by the respective card reader device 530. For example, a value of the parameter for a tap read by the near-field communication circuitry 534 may differ from the value of the parameter for a chip read by insertion in the chip reader slot 532 or magnetic strip reader 536.

The payment information obtained from the contact pad 518 of the contactless card 508, when the contact pad 518 is within close enough proximity of the electromagnetic field 538 or is inserted into the chip reader slot 532 or the magnetic strip reader 536 of the card reader device 530 may be processed by the card reader device 530.

Although not specifically shown, the processing circuitry 524 may include some of the elements of processing circuitry 206. For example, the processing circuitry 524 may include a power supply operable to provide electrical power to at least one of the processing circuitry 524 or the electromagnetic field sensing circuitry, e.g., the sensors 510, 512, 514, 516 and 520. In addition, the processing circuitry 524 may include a communication interface, such as communication interface 210, that is operable to communicate with a wireless communication interface (e.g., near-field communication circuitry 534 of the card reader device 530) via a wireless communication protocol (e.g., NFC protocol).

In a further example, the card reader device 530 may be a portable device or be part of a dongle 550 (or other device) that is coupled to a mobile device of a merchant. For example, a merchant at a community farmer's market may utilize a portable card reader device (e.g., dongle 550) as card reader device 530. In such a situation, the contactless card 508 may be communicatively coupled, via communication link 546, as well as cryptographically coupled to a mobile device 544 associated with the user identification information, such as 106 of FIG. 1, of the contactless card 508. In this specific example of a card orientation indication system 500c, via for example, a communication interface, such as communication interface 210, may be operable to obtain a location indication from a global positioning system application or a Wi-Fi access point via the communication link 546 with the mobile device 544. For example, the communication interface of the processing circuitry 524 may be operable to communicate with the wireless communication interface of the mobile device 544 via a wireless communication protocol, such as Bluetooth, an NFC protocol, or the like. For example, the processing circuitry 524 may include circuitry that enables a transceiver or a device with similar functionality.

In the example, the mobile device 544 may enable the processing circuitry 524 to determine a location of the mobile device 544. For example, the location of the mobile device 544 may be the location at which the card reader device 530 is located. A companion app 548 may also be operable to enable a user to select which payment modality is preferred, such as a chip reader slot 532 or a tap gesture to be read by near-field communication circuitry 534. The companion app 548 may also provide other capabilities and settings such as security settings or the like. Based on the determined location of the mobile device 544, the companion app 548 executing on the mobile device 544 may access card reader configuration standards for the determined location of the mobile device 544. The card reader configuration standards may be delivered to the processing circuitry 524, which may update the card orientation indicator circuitry 522 to compensate orientation indication signals delivered to the card orientation indicator device 526. For example, the card orientation indicator circuitry 522 may utilize the card reader configuration standards when determining the angle of the contactless card (in each of the X-axis, Y-axis, or Z-axis) with respect to the oscillating electromagnetic field 538 output by the card reader device 530.

The card orientation indicator device 526 may be operable to provide different types of orientation indications to a user. As discussed above, the card orientation indicator device 526 may be incorporated into processing circuitry 524 in a manner similar to the card orientation indicator circuitry 522. For example, as shown in FIG. 2 as part of sensing/indication circuitry 214. But for ease of illustration, the card orientation indicator device 526 is shown separately in the example of FIG. 5C. In an operational example, the card orientation indicator device 526 of the card orientation indication system 500c may be operable to receive the orientation indication signals from card orientation indicator circuitry 522. In the example, the orientation indication signals may include a number of individual data values output by the sensing circuitry (i.e., sensors 510-516 and 520). In the example, the card orientation indicator circuitry 522 (i.e., a processor) may be operable to determine, from the number of individual data values, a direction, a distance and an angle of the contactless card 508 with respect to the oscillating electromagnetic field 538 output by the card reader device 530.

The direction, the distance and the angle of the contactless card 508 with respect to the oscillating electromagnetic field 538, the processor may output orientation indication signals that actuate a haptic device to produce a haptic indication. The haptic indication may indicate the direction, the distance and the angle of the contactless card 508 with respect to the oscillating electromagnetic field output by the card reader device. The haptic indication may for example vibrate at various frequencies as the contactless card 508 gets closer to the near-field communication circuitry 534 to complete a tap gesture, or closer to being able to insert the card into the magnetic strip reader 536 or the chip reader slot 532. Alternatively, the card orientation indicator device 526 may, for example, be an audio device, and the orientation indication signals may actuate the audio device to produce an audio indication to indicate the direction, the distance and the angle of the contactless card 508 with respect to the oscillating electromagnetic field output by the card reader device 530.

Other technical features may be readily apparent to one skilled in the art from the following figures, descriptions, and claims.

Figure 6:
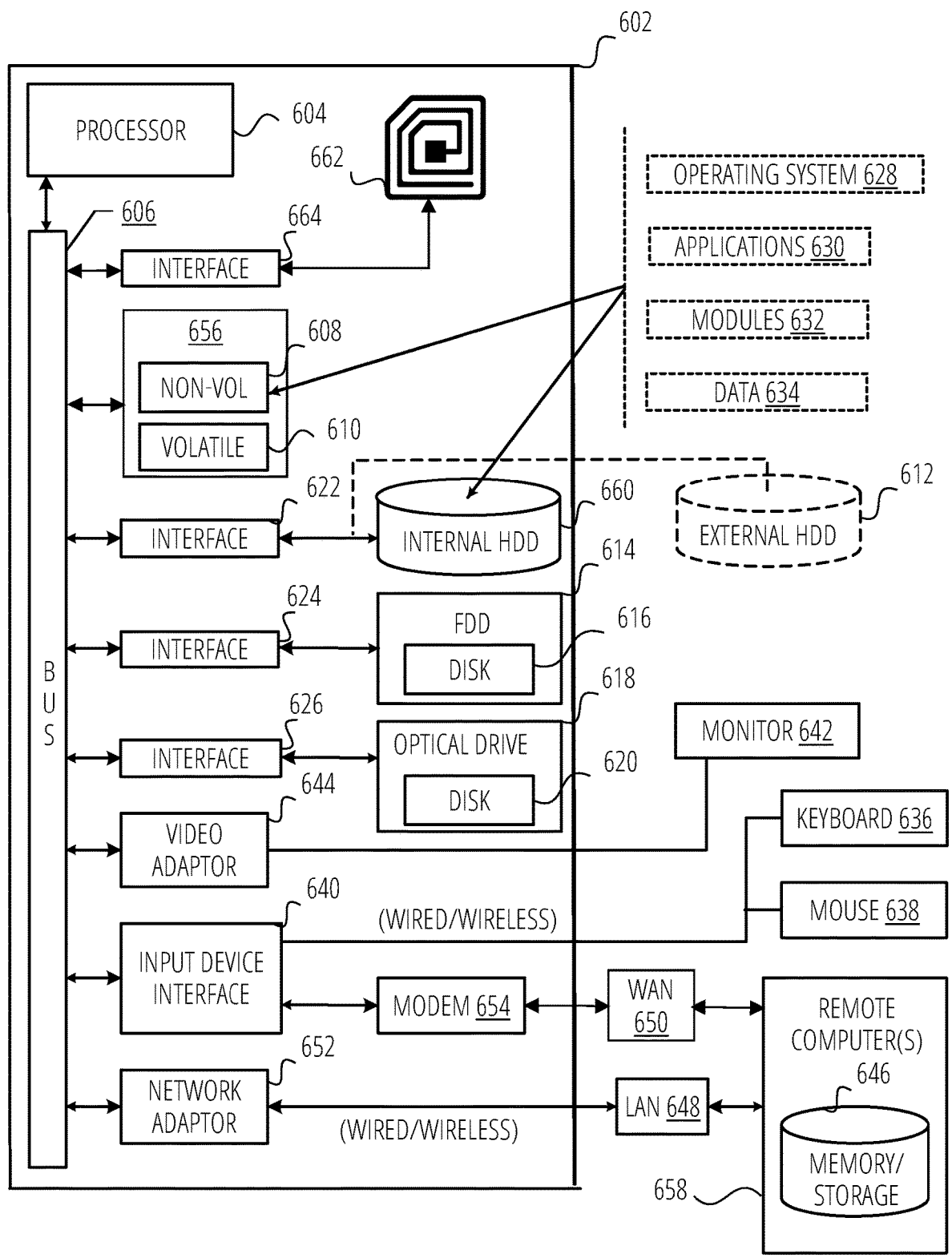
FIG. 6 illustrates an example of an exemplary computing architecture that may be suitable for implementing various examples as previously described.

FIG. 6 illustrates an example of an exemplary computing architecture 602 that may be suitable for implementing various examples as previously described. In various examples, the computing architecture 602 may include or be implemented as part of an electronic device. In some examples, the computing architecture 602 may be representative, for example, of the card reader device 530. The examples are not limited in this context. More generally, the computing architecture 602 may be operable to implement all the logic, applications, systems, methods, apparatuses, and functionality described herein with reference to the examples of FIGS. 1-5C.

The computing architecture 602 may include various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The examples, however, are not limited to implementation by the computing architecture 602.

As shown in FIG. 6, the computing architecture 602 comprises a processor 604, a system memory system bus 606 and a system bus 608. The processor 604 can be any of various commercially available computer processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core®, Core (2) Duo®, Itanium®, Pentium®, Xeon®, and XScale® processors; and similar processors. Dual microprocessors, multi-core processors, and other multi-processor architectures may also be employed as the processor 604.

The system bus 606 provides an interface for system components including, but not limited to, the system memory 656 to the processor 604. The system bus 606 can be any of several types of bus structure that may further interconnect to a memory bus (with or without a memory controller), a peripheral bus, and a local bus using any of a variety of commercially available bus architectures. Interface adapters may connect to the system bus 606 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (PCI), PCI Extended (PCI(X)), PCI Express, Personal Computer Memory Card International Association (PCMCIA), and the like.

The near-field communication circuitry 662 may be coupled to the processor 604 via an interface 664 and be operable to receive and transmit payment information. For example, the near-field communication circuitry 662 may emit an electromagnetic field, such as electromagnetic field 538 of FIG. 5C as well as perform other functions.

In the illustrated example shown in FIG. 6, the system memory 656 may include non-volatile memory (non-vol) 608 and/or volatile memory 610. For example, the system memory 656 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory (e.g., one or more flash arrays), polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. A basic input/output system (BIOS) can be stored in the non-volatile memory 612.

The computing architecture 602 may include various types of computer-readable storage media in the form of one or more lower speed memory units, including an internal hard disk drive (HDD) 660, a magnetic floppy disk drive (FDD) 614 to read from or write to a removable magnetic disk 616, and an optical disk drive 618 to read from or write to a removable optical disk 620 (e.g., a CD-ROM or DVD). The HDD 660 or 612, the FDD 614 and optical disk drive 618 can be connected to the system bus 606 by an HDD interface 622, an FDD interface 624 and an optical drive interface 626, respectively. The HDD interface 622 for external drive implementations can include at least one or both of Universal Serial Bus (USB) and IEEE 1394 interface technologies. The computing architecture 602 is generally configured to implement all logic, systems, methods, apparatuses, and functionality described herein with reference to FIGS. 1-5.

The drives and associated computer-readable media provide volatile and/or nonvolatile storage of data, data structures, computer-executable instructions, and so forth. For example, a number of program modules can be stored in the drives and memory units 608, 610, including an operating system 628, one or more application programs (or "applications") 630, other program modules 632, and program data 634. In one example, the one or more applications 630, other program modules 632, and program data 634 can include, for example, the various applications and/or components of the computing architecture 602 or the like.

A user, for example, can enter commands and information into the computing architecture 602 through one or more wire/wireless input devices, for example, a keyboard 636 and a pointing device, such as a mouse 638. Other input devices may include microphones, infra-red (IR) remote controls, radio frequency (RF) remote controls, game pads, stylus pens, card readers, dongles, fingerprint readers, gloves, graphics tablets, joysticks, keyboards, retina readers, touch screens (e.g., capacitive, resistive, etc.), trackballs, trackpads, sensors, styluses, and the like. These and other input devices are often connected to the processor 604 through an input device interface 640 that is coupled to the system bus 606 but can be connected by other interfaces such as a parallel port, IEEE 1394 serial port, a game port, a USB port, an IR interface, and so forth.

A monitor 642 or other type of display device is also connected to the system bus 606 via an interface, such as a video adaptor 644. The monitor 642 may be internal or external to the computing architecture 602. In addition to the monitor 642, a computer typically includes other peripheral output devices, such as speakers, printers, and so forth.

The computing architecture 602 may operate in a networked environment using logical connections via wire and/or wireless communications to one or more remote computers, such as a remote computer 658. The remote computer 658 can be a workstation, a server computer, a router, a personal computer, portable computer, microprocessor-based entertainment appliance, a peer device or other common network node, and typically includes many of or all the elements described relative to the computing architecture 602, although, for purposes of brevity, only a memory/storage device 646 is illustrated. The logical connections depicted include wire/wireless connectivity to a local area network (LAN) 648 and/or larger networks, for example, a wide area network (WAN) 650. Such LAN and WAN networking environments are commonplace in offices and companies, and facilitate enterprise-wide computer networks, such as intranets, all of which may connect to a global communications network, for example, the Internet. In the examples, the communication link 546 of FIG. 5C may be provided through one or more of the LAN 648 and the WAN 650.

When used in a LAN networking environment, the computing architecture 602 is connected to the LAN 648 through a wire and/or wireless communication network interface or network adaptor 652. The network adaptor 652 can facilitate wire and/or wireless communications to the LAN 648, which may also include a wireless access point disposed thereon for communicating with the wireless functionality of the network adaptor 652.

When used in a WAN networking environment, the computing architecture 602 can include a modem 654, or is connected to a communications server on the WAN 650 or has other means for establishing communications over the WAN 650, such as by way of the Internet. The modem 654, which can be internal or external and a wire and/or wireless device, connects to the system bus 608 via the input device interface 640. In a networked environment, program modules depicted relative to the computing architecture 602, or portions thereof, can be stored in the remote memory/storage device 646. It will be appreciated that the network connections shown are exemplary and other means of establishing a communications link between the computers can be used.

The computing architecture 602 is operable to communicate with wired and wireless devices or entities using the IEEE 802 family of standards, such as wireless devices operatively disposed in wireless communication (e.g., IEEE 802.16 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

As used in this application, the terms "system" and "component" and "module" are intended to refer to a computer-related entity, either hardware, a combination of hardware and software, software, or software in execution, examples of which are provided by the exemplary computing architecture 800. For example, a component can be, but is not limited to being, a process running on a computer processor, a computer processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further examples, however, may alternatively employ data messages. Such data messages may be sent across various connections. Exemplary connections include parallel interfaces, serial interfaces, and bus interfaces.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores," may be stored on a tangible, machine readable medium and supplied to various customers or manufacturing facilities to load into the fabrication machines that make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner and may generally include any set of one or more features as variously disclosed or otherwise demonstrated herein.

What is claimed is:

1. A contactless card, comprising:
    a body of the contactless card, the body comprising a first location, wherein contacts or an antenna for communications with a card reader reside at the first location;
    a set of sensors located at different locations about the body, operable to generate signals while in close proximity to a source of an oscillating electromagnetic field of the card reader, each sensor of the set of sensors to detect a different magnitude of the oscillating electromagnetic field and generate a signal indicative of the magnitude of the oscillating electromagnetic field;
    a card orientation indicator circuitry operable to output an indication of an orientation of the contactless card; and
    a processor coupled to the set of sensors, wherein the processor is operable to:
        determine, based on the magnitudes of the generated signals and the different locations of the set of sensors, the orientation of the contacts or the antenna for communications with respect to the card reader,
        generate an orientation signal based on a determination of the orientation,
        output the orientation signal to the card orientation indicator circuitry,
    wherein the card orientation indicator circuitry is operable to;
        in response to the received orientation signal, generate an orientation indication signal to indicate a movement of the contactless card to adjust the orientation of the contacts or the antenna for communications with respect to the card reader.

2. The contactless card of claim 1, wherein the orientation indication signal of the contactless card indicates a position of the contacts or an antenna for communications relative to the card reader.

3. The contactless card of claim 1, wherein the set of sensors detect a polarity of the oscillating electromagnetic field.

4. The contactless card of claim 1, wherein each sensor comprises a circuit responsive to a strength of the oscillating electromagnetic field.

5. The contactless card of claim 1, further comprising:
    a card orientation indicator device operable to respond to the orientation signal, wherein the card orientation indicator device is a vibrational device that is operable to vibrate the contactless card when the orientation signal indicates that the determined orientation of the contactless card is unaligned with the oscillating electromagnetic field.

6. The contactless card of claim 1, further comprising an accelerometer.

7. The contactless card of claim 6, wherein the processor is operable to:
    evaluate a magnitude and a polarity of an X-axis signal, a magnitude and a polarity of a Y-axis signal and a magnitude and a polarity of a Z-axis signal;
    determine the orientation of the contactless card in an X-axis, Y-axis and Z-axis based on the magnitude and the polarity of the X-axis signal, the magnitude and the polarity of the Y-axis signal, and the magnitude and the polarity of the Z-axis signal.

8. The contactless card of claim 1, further comprising a combination of a gyroscope and an accelerometer.

9. The contactless card of claim 8, wherein the processor is operable to:
    evaluate an X-axis magnitude and an X-axis polarity of an X-axis signal, a Y-axis magnitude and a Y-axis polarity of a Y-axis signal and a Z-axis magnitude and a Z-axis polarity of a Z-axis signal;
    evaluate an angular velocity signal relative to a rotation of the contactless card based on the X-axis signal, the Y-axis signal, and the Z-axis signal;
    determine the orientation of the contactless card in an X-axis, Y-axis and in a Z-axis based on the X-axis magnitude and the X-axis polarity of the X-axis signal, the Y-axis magnitude and the Y-axis polarity of the Y-axis signal, the Z-axis magnitude and the Z-axis polarity of the Z-axis signal and the angular velocity signal.

10. The contactless card of claim 1, further comprising:
    a card orientation indicator device operable to generate an output in response to the orientation signal, wherein the card orientation indicator device is at least one of a light emitting diode, a vibrating motor, a speaker, or a combination thereof.

11. A contactless card, comprising:
    a body of the contactless card including a communication interface, processing circuitry, and a set of sensors distributed across different locations about the body, the communication interface to communicate with an application of a mobile device;
    the set of sensors to generate field signals related to distances between a card reader and each of the different locations about the body of the contactless card, the field signals indicative of a magnitude of an electromagnetic field at each of the different locations about the body:

the processing circuitry to communicate magnitudes for each of the different locations to the application of the mobile device;

the processing circuitry to receive a result from the application; and the processing circuitry to output a haptic indication, an audio indication, a visual indication or a combination, directing movement of the contactless card in a particular direction based on the result.

12. The contactless card of claim 11, wherein the contactless card further comprises:

a power supply operable to provide electrical power to at least the set of sensors.

13. The contactless card of claim 11, wherein the communication interface is operable to communicate via a wireless communication protocol.

14. The contactless card of claim 13, wherein the communication interface is a wireless communication transceiver operable to communicate via the wireless communication protocol.

15. The contactless card of claim 11, wherein:

the set of sensors includes a number of circuits responsive to a strength and a polarity of an electromagnetic field produced by the card reader.

16. The contactless card of claim 15, wherein each of the field signals indicate a polarity.

17. The contactless card of claim 11, wherein a chosen orientation of the contactless card is one in which a chip component of the contactless card is closest to the card reader.

18. The contactless card of claim 11, further operable to:

transmit, to the application, a number of individual data values output by the set of sensors;

receive the result, wherein the result comprises a direction, a distance and an angle of the contactless card with respect to an oscillating electromagnetic field output by the card reader; and actuate one or more outputs to indicate the direction, the distance, and the angle of the contactless card with respect to the electromagnetic field output by the card reader.

19. The contactless card of claim 11, operable to:

determine a number of individual data values output by the set of sensors;

receive the result, wherein the result comprises a direction, a distance, and an angle of the contactless card with respect to the electromagnetic field output by the card reader; and actuate a haptic device to produce the haptic indication to indicate the direction, the distance, and the angle of the contactless card with respect to the electromagnetic field output by the card reader.

20. The contactless card of claim 11, further operable to:

actuate one or more light emitting diodes to produce an indication of the direction, the distance, and an angle of the contactless card with respect to the electromagnetic field output by the card reader.

* * * * *